Figure 1:
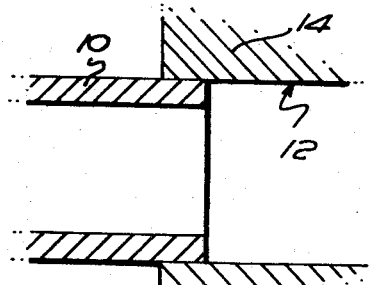

United States Patent [19]

Charlesworth

[11] 3,769,489
[45] Oct. 30, 1973

[54] WELDING OF TUBES TO TUBE PLATES
[75] Inventor: Eric Charlesworth, Sheffield, England
[73] Assignee: Robert Jenks & Company Limited, Rotherham, England
[22] Filed: Dec. 29, 1971
[21] Appl. No.: 213,630

[30] Foreign Application Priority Data
Jan. 12, 1971  Great Britain .................. 1,471/71

[52] U.S. Cl. ............ 219/125 R, 29/482, 219/60 A, 219/105
[51] Int. Cl. .................................................. B23k 9/12
[58] Field of Search .................. 219/60 R, 60 A, 61, 219/105, 125 R, 137; 165/178; 29/482

[56] References Cited
UNITED STATES PATENTS
3,536,886  10/1970  Juélg et al. .................. 219/125 R
3,440,391  4/1969  Apblett .......................... 219/125 R
2,824,212  2/1958  Roberts .......................... 165/178 X
2,678,224  5/1954  Kooistra ........................ 165/178 X
2,777,937  1/1957  Bryant .......................... 219/125 R Primary Examiner—J. V. Truhe
Assistant Examiner—L. A. Schutzman
Attorney—Lackenbach & Lackenbach

[57]  ABSTRACT

A method of welding tubes to tube plates of heat exchangers, including a weld preparation which involves counterboring the end of each tube either before or after it is entered into a hole in the tube plate so that the molten "pool" of metal during the subsequent welding operation is as small as possible and so that the direction in which the arc is struck between the welding electrode and tube is stabilised.

6 Claims, 7 Drawing Figures

PATENTED OCT 30 1973  3,769,489

SHEET 1 OF 2

WELDING OF TUBES TO TUBE PLATES

The invention relates to the welding of tubes to tube plates and has for its object to provide an improvement therein. In particular, but not exclusively, the invention relates to the preparation of tubes and tube plates whereby satisfactory welds can be produced by so-called bore welding, that is to say, by the technique of using a non-consumable electrode mounted at one end of a rotatable holder, the arrangement being such that the electrode can be inserted into or positioned adjacent the end of a tube which has been entered into a hole in a tube plate so that as the holder rotates, moving the electrode around within the bore of the tube or around an annular end surface of the tube, the arc which is produced between the electrode and the tube generates intense heat and locally melts the wall of the tube and the adjacent area of the tube plate, the two thereby being fused together. Ideally, of course, the weld will be such that the tube and the tube plate are melted and then fused together along the whole of the surface at which they touch, hence the common practice of entering the tube only a short distance into the tube plate. However, this distance has been found to be very critical; if it is too little there is insufficient molten metal at the moment of fusion to produce a satisfactory weld; if it is too great, melting and fusion do not take place along the whole surface at which the tube and tube plate touch so that there is then formed a crevice in which corrosion can occur. It has also been found that the positioning of the electrode is also very critical. It obviously must not touch the end of the tube, or the internal surface of the hole in which the tube has been inserted, or arcing will not be produced. On the other hand, if the electrode is too far away from the end of the tube the arc will be deflected towards the main mass of metal in the tube plate with the result that the pool of molten metal will not be centred about the length of the surface along which the tube and tube plate touch.

According to one aspect of the invention, the end of a tube which is to be welded in position in a tube plate is counterbored so that, with the tube in position in the tube plate, the wall thickness of the tube at its extremity is less than the wall thickness of the tube in a plane containing the surface of the tube plate. Preferably, the counterbore will be a cylindrical and flat bottomed counterbore so that the transition from one wall thickness to the other is sudden. Preferably, also, the wall thickness of the tube at its extremity will be between one quarter and three quarters of the wall thickness in a plane containing the surface of the tube plate.

According to another aspect of the invention, a method of welding a tube to a tube plate includes the steps of entering at least a counterbored end of a tube into a hole in the tube plate, positioning a non-consumable electrode adjacent the counterbored end portion of the tube or of inserting it into the counterbored end of said tube and moving the electrode around adjacent to or within said counterbored end portion so that the arc which is produced between the electrode and the adjacent surface of the tube generates intense heat in the required region in which the tube touches the tube plate. The method may involve the counterboring of the end of the tube before it is entered into or extends through a hole in the tube plate. Alternatively, the method may involve the counterboring of the end of the tube, or a final counterboring in a partially bored out end of the tube, when the end of the tube has been entered into or extends through the hole in the tube plate. In this latter case, the counterboring or final counterboring, as the case may be, will be such that the wall thickness of the tube at its extremity will be between one quarter and three quarters of the wall thickness of the tube in a plane containing the surface of the tube plate.

According to a further aspect of the invention, there is provided a tube and tube plate welded together by the method described above.

According to a still further aspect of the invention, there is provided a heat exchanger including a tube plate and a plurality of tubes welded thereto by the method described above.

According to yet a further aspect of the invention, there is provided a method of making a heat exchanger which includes the steps of welding one end of each of a plurality of tubes in position in a first tube plate; counterboring the opposite ends of said tubes, when located in or extending through holes in a second tube plate, to a depth measured from the face of said tube plate; and welding each thus counterbored end portion in position in the second tube plate in turn by inserting a non-consumable electrode into the counterbored end portion, and moving the electrode around within said counterbored end portion so that the arc which is produced between the electrode and the adjacent surface of the tube concerned generates intense heat in the required region in which the tube touches the second tube plate. The method will preferably include the initial steps of counterboring the one end of each tube before it is positioned in a hole in the first tube plate, and positioning that end of the tube in said hole prior to welding it in position to ensure the correct depth of projection into the hole of a part of the end of the tube having a relatively greater wall thickness. The method may include the further initial step of partially boring out the opposite ends of the tubes, that is to say, boring them out to a lesser depth (and possibly at a reduced diameter) than will be carried out with the tubes in position in the tube plates.

Figure 2:
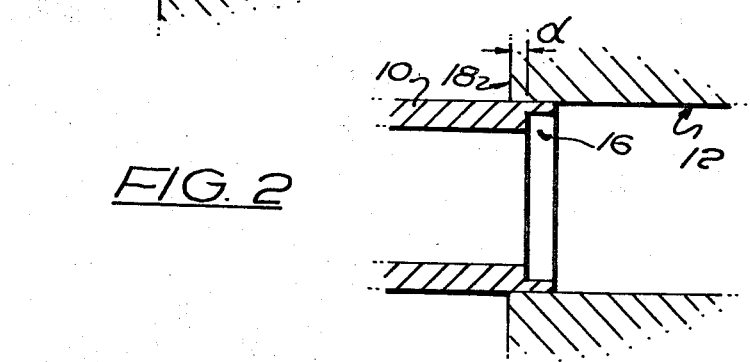
Figure 3:
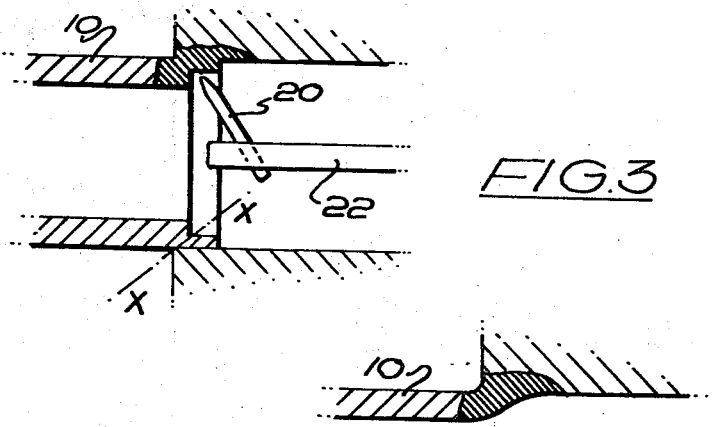
Figure 4:
Figure 5:
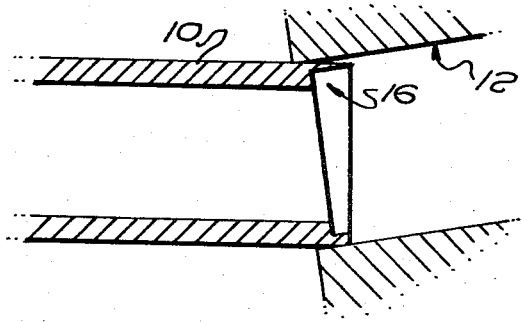
Figure 6:
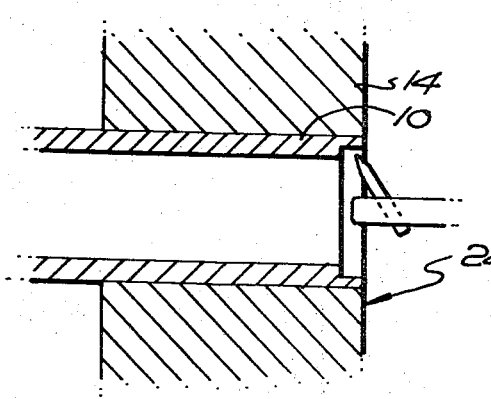
Figure 7:
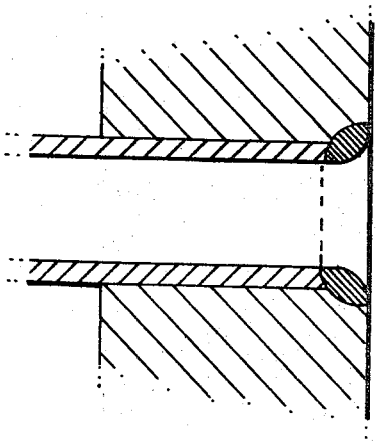

In order that the invention may be fully understood and readily carried into effect, the same will now be described, by way of example only, with reference to the accompanying drawings, of which:

FIG. 1 is a sectional scrap view showing a tube entered into a hole in a tube plate in readiness for a machining operation and a subsequent so-called bore welding operation, FIG. 2 is a sectional scrap view which illustrates the machining operation which has been carried out with the tube end in situ in the tube plate, FIG. 3 is a view similar to FIG. 2 and showing the positioning of a non-consumable electrode prior to the bore welding operation being carried out, FIG. 4 is a view illustrating the desirable form of weld achieved by the inventive method, FIG. 5 is a view similar to FIG. 2 which will presently be referred to, FIG. 6 is a view similar to FIG. 3 but showing the tube extending fully through the hole in the tube plate in readiness for a welding operation which will weld the tube to the outside face of the plate, and FIG. 7 is a view illustrating the desirable form of weld achieved in this instance.

Referring now to the drawings, FIG. 1 shows a tube 10 having been entered into a hole 12 in a tube plate 14 prior to a machining operation and a subsequent so-called bore welding operation. (The distance by which it has been entered into the tube is not very critical and does not call for great precision. Normal variation due to distortion of the tube plate for example can quite easily be tolerated).

In FIG. 2 there is illustrated the shape of the tube end after the machining operation has been carried out. The tube end has been counterbored at 16 so that the wall thickness of the tube at its extremity is about one third of the wall thickness of the tube in a plane containing the surface 18 of the tube plate. (It is thought that this dimension is not very critical but trials and experiments will show what dimensional limits should be observed for various sizes of tube). The depth of counterbore is quite critical in the sense that the distance $a$ between the bottom of the counterbore and a plane containing the surface 18 of the tube plate should be held within close limits. Here again, what these limits should be and what the ideal distance $a$ will be for any particular size of tube, or for the electric power to be used in carrying out the subsequent welding operation, or having regard to any other variable, may be determined by trial and experiment. The counterbore is a cylindrical and flat bottomed counterbore.

In FIG. 3 there is illustrated the positioning of a non-consumable electrode 20 in the counterbored end of the tube prior to the bore welding operation being carried out. The electrode 20 is mounted at one end of a rotatable holder 22 so that as the holder rotates, the electrode moves around within the counterbored end of the tube and an arc which is produced between the electrode and the tube generates intense heat and locally melts the wall of the tube and the adjacent area of the tube plate. The two are thereby fused together. The area in which the metal is melted is indicated by cross hatched lines in FIG. 3.

FIG. 4 illustrates the desirable form of weld which it has been found can be consistently achieved by the inventive method when bore welding. The weld is shown to have penetrated to the back face of the tube plate. Thus it is known that no crevice exists between the tube and tube plate. The shape of the final weld at the bore of the tube is of course brought about by surface tension whilst the "filler" metal is still molten and is dependent upon the amount of "filler" metal, that is to say upon the size of the molten "pool" of metal during welding. It is desirable that this should be kept as small as possible. The use of the present method tends to promote this. It will be seen that the shape of the tube end brought about by the machining operation which has been carried out before welding has approximated to the shape of the desirable form of finished weld. This fact is thought to have helped to reduce the amount of molten "filler" metal.

It will also be seen that the machining operation has produced a narrow region along the line X—X in FIG. 3 and it is thought that this fact tends to ensure the penetration of the weld to the back face of the tube plate as shown in FIG. 4.

The positioning of the electrode within the counterbored end of the tube as welding takes place tends to stabilise the direction in which the arc is struck between the electrode and tube, that is to say, it has been found that the arc is not as likely to be deflected towards the main mass of metal in the tube plate as has previously been the case when bore welding. This has been found to be so even when the overall distance by which the tube has been entered into the hole in the tube plate, including the length of the relatively thin-walled portion of tube, has varied by an amount which in a plain-ended tube would cause considerable arc shift and unsatisfactory welding.

Referring now to FIG. 5, a further advantage which has been found to result from this invention is that if the tube plate happens to be distorted so that the end of the tube is not quite perpendicular to it, the machining operation very largely compensates for this. In FIG. 5 for the sake of illustration, the tube plate is shown to have suffered a somewhat exaggerated degree of distortion so that a tube which has been entered into a hole therein extends noticeably further into it at its upper portion than at its lower portion. However, a machining operation which has been carried out from the front face of the tube plate has compensated for this, that is to say, the cutting tool has been entered into the end of the tube in a direction truly perpendicular to the front face of the tube plate so that, in effect, the only variation in the distance by which the tube extends into the tube plate is confined to the relatively thin-walled portion of the tube. It has been found that this variation has had no apparent effect on the location of the arc which has subsequently been struck between the electrode and tube as welding has taken place. This is in contrast to what has resulted from such variations when bore welding plain tubes in distorted tube plates. (Such distortion is quite frequently met with when welding tubes to tube plates because the heat produced when welding the first tubes in position distorts the tube plate, progressively more so as more tubes are welded therein).

Referring now to FIGS. 6 and 7, these illustrate the use of the invention prior to a welding operation which will weld the tube to the outside face of the plate. In FIG. 6, the tube 10 is shown to have been inserted the full depth of the hole in the tube plate so that the extremity of the tube is flush with the outside face 24 of the plate. The end of the tube is shown to be counterbored, substantially as the tube illustrated in FIG. 2, and again the wall thickness of the tube at its extremity is not very critical, being in the region of about one third the original wall thickness.

It will be understood that the counterboring operation may have been carried out before or after the tube has been positioned in the tube plate, but if it has already been welded at its opposite end in a first tube plate and the operation depicted in FIGS. 6 and 7 is the welding of the tube in a second tube plate it will be understood that it will be preferable to counterbore that end of the tube in situ in said second tube plate so that the depth of the counterbore from the outside face of the plate can be closely controlled. Distortion of the tube plates may have caused the extremity of the tube to be located in a plane displaced from the outside surface of the tube plate but, as previously explained in connection with the use of the invention for bore welding, the position to which the relatively thin walled portion of the tube extends (representing as it does a relatively small amount of molten metal in the subsequent molten "pool" of metal) is not critical.

FIG. 7 illustrates the desirable form of weld achieved by using the invention prior to welding the tube to the outside face of the tube plate. It will be seen that the weld "pool" produced during the welding operation has, due to surface tension, solidified into a flared form at the end of the tube. The area in which the metal has been melted is indicated by the cross hatched lines. This amount and general form of weld "pool" has been found to result in a very satisfactory finished weld.

Various modifications may be made without departing from the scope of the invention and of course it will be understood that when employing the invention to make a heat exchanger, one end of each tube may be welded in position in a first tube plate by means of a conventional welding process (which may or may not be a bore welding process) without that end of the tube being counterbored (because it is when welding the tube to the second tube plate that difficulty arises). On the other hand of course, that end of each tube may initially be counterbored before it is positioned in a hole in the first tube plate because that end of the tube can readily be correctly positioned prior to welding the end of the tube in position to ensure the correct depth of projection into the hole of a part of the end of the tube having a relatively greater wall thickness, that is to say, having the original wall thickness. It will also be understood that the other ends of the tubes could quite well be partially bored out before the tubes are entered into the tube plates, that is to say, may be bored out to a lesser depth (and possibly at a reduced diameter) than will be carried out with the tubes in position in the tube plates.

Thus there is provided a method of welding tubes to tube plates, and what may be termed a weld preparation, which has been found very effective in ensuring a satisfactory weld, consistently, and without procedures difficult to carry out. A hand held apparatus will generally be used to effect the counterboring, or final counterboring, of the tubes in situ with the tube plates, and it has been found to be an operation which can be carried out without great difficulty because it requires the removal of only a small amount of metal, that is to say, less than the total wall thickness of the tube.

I claim:

1. A method of welding a tube to a tube plate, comprising at least the steps of counterboring the end of a tube to produce a reduced thickness wall adjacent the tube end, entering at least said end into a mating hole in the tube plate, positioning a non-consumable electrode within the counterbore, and rotating the electrode around within said counterbore and spaced apart from said wall while applying an arc inducing current thereto so that the arc which is produced between the electrode and the adjacent surface of said counterbore generates sufficient heat in said reduced thickness wall and the region of said tube plate surrounding such mating hole in which the tube touches the tube plate as to form a weld therebetween.

2. The method of welding a tube to a tube plate according to claim 1, wherein said counterboring of the end of the tube is such to such depths that the wall thickness of the tube at its extremity is between one quarter and three quarters of the original wall thickness of the tube and approximates the desired finished contour of the weld to provide a smoothly curved contour thereto.

3. The method of welding a tube to a tube plate according to claim 1, wherein at least a final counterboring of the end of the tube is performed after positioning of the end of the tube within the hole in the tube plate and the axis of said final counterboring is parallel the axis of said hole.

4. A method of making a heat exchanger, including the steps of welding one end of each of a plurality of tubes in position in a first tube plate; counterboring said opposite ends of said tubes from the other side of said second tube plate to a depth less than the thickness of said second tube plate to define a shoulder of said counterbore within said second tube plate and spaced apart from the face of said second tube plate facing said first tube plate; and welding each thus counterbored end portion in position in the second tube plate in turn by inserting a non-consumable electrode into the counterbored end portion and rotating the electrode around within said counterbored end portion in spaced apart relation thereto while discharging an arc therebetween so that the arc which is produced between the electrode and the adjacent surface of the tube concerned generates intense heat in the region in which the tube touches the second tube plate and forms a weld therebetween.

5. A method of making a heat exchanger according to claim 4, including the initial steps of counterboring the one end of each tube before it is positioned in a hole in the first tube plate, and positioning that end of the tube in said hole, prior to welding it in position, a distance greater than the depth of said initial counterboring to ensure the projection into the hole of a part of the end of the tube beyond said initial counterboring and therefore having a relatively greater wall thickness.

6. A method of making a heat exchanger according to claim 4, including the initial step of partially boring out the other ends of the tubes before they are entered into the respective holes in the second tube plate so that the in situ counterboring required is reduced.

* * * * *